United States Patent [19]

Batten

[11] Patent Number: 4,823,653

[45] Date of Patent: Apr. 25, 1989

[54] FREE SPINNING, SELF-LOCKING THREADED FASTENER, AND METHOD AND TOOL FOR SETTING IT

[75] Inventor: Ronald W. Batten, Torrance, Calif.

[73] Assignee: Hi-Shear Corporation, Torrance, Calif.

[21] Appl. No.: 50,246

[22] Filed: May 13, 1987

Related U.S. Application Data

[62] Division of Ser. No. 653,693, Sep. 21, 1984.

[51] Int. Cl.$^4$ .............................................. B25B 23/145
[52] U.S. Cl. .......................................... 81/468; 29/517
[58] Field of Search ................. 29/517, 526 R; 72/75, 72/406; 81/468, 471, 59.1

[56] References Cited

U.S. PATENT DOCUMENTS

| | | | |
|---|---|---|---|
| 1,412,688 | 4/1922 | Layton et al. | 81/59.1 |
| 2,730,000 | 1/1956 | Critten | 81/59 X |
| 3,603,132 | 9/1971 | Holmes | 29/517 X |
| 3,842,878 | 10/1974 | Duer . | |
| 4,069,575 | 1/1978 | Sigmund | 29/517 X |
| 4,383,353 | 5/1983 | Stencel | 29/517 |
| 4,393,734 | 7/1983 | Thorn et al. | 81/468 |
| 4,601,623 | 7/1986 | Wallace . | |
| 4,649,727 | 3/1987 | Gray | 81/471 |

FOREIGN PATENT DOCUMENTS 332463  7/1930  United Kingdom .

Primary Examiner—James G. Smith
Attorney, Agent, or Firm—Donald D. Mon

[57] ABSTRACT

A fastener having an external threaded pin, and an internally threaded collar freely spinnable onto the pin so as to be set to a predetermined torque. After the predetermined torque is applied, the collar is dimpled (indented) to lock the collar to the pin. The thread can be smooth so the lock is a smooth frictional running lock, or can be interrupted so material of the collar at the indentation forms a physical lock with the interrupted thread. A tool is shown that can drive and indent the collar. A method for setting the collar is also disclosed.

5 Claims, 2 Drawing Sheets

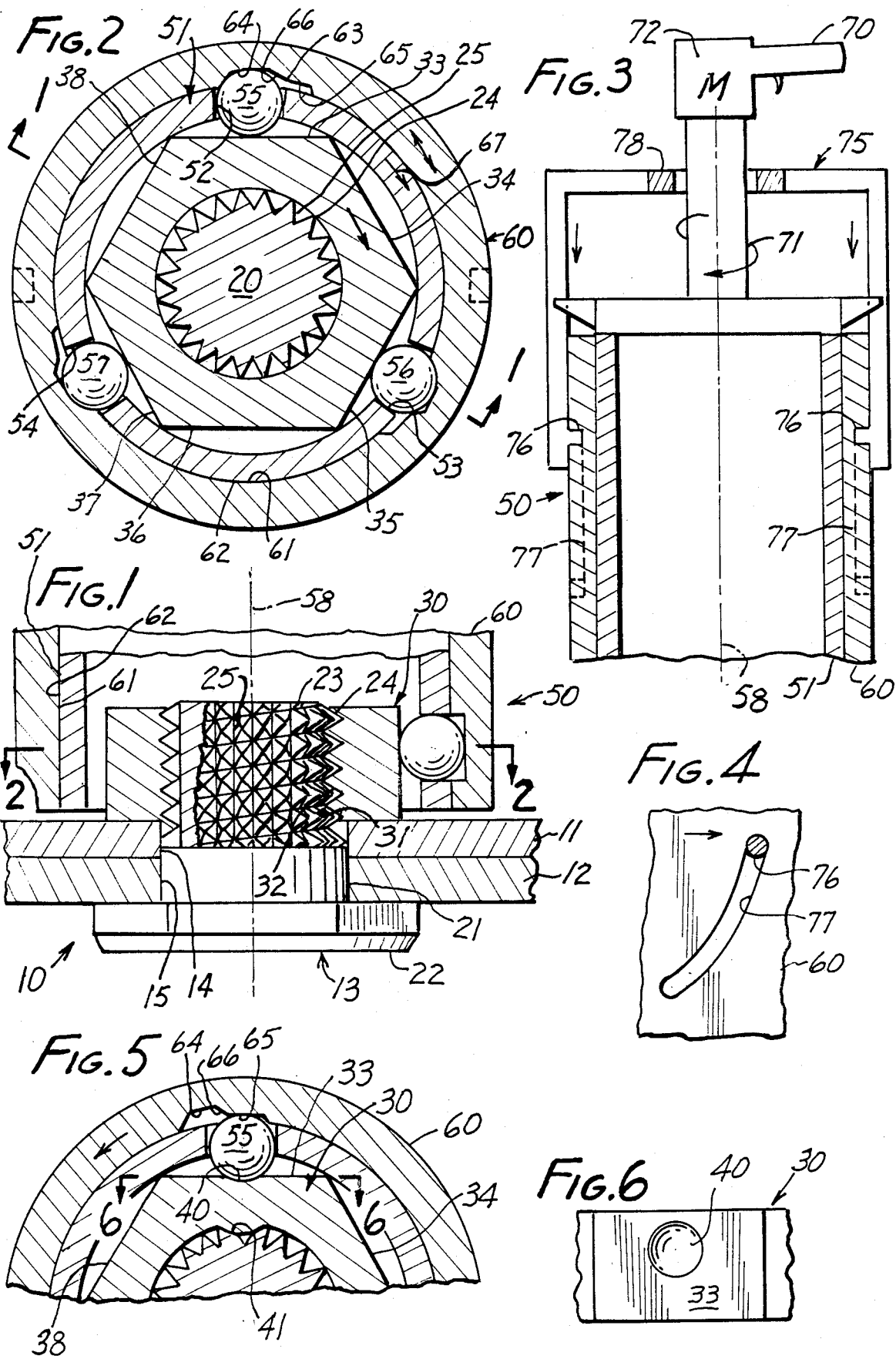

FREE SPINNING, SELF-LOCKING THREADED FASTENER, AND METHOD AND TOOL FOR SETTING IT

CROSS REFERENCE TO CO-PENDING APPLICATION

This is a division of U.S. patent application Ser. No. 06/653,693, filed Sept. 21, 1984, entitled FREE SPINNING, SELF-LOCKING THREADED FASTENER AND METHOD FOR SETTING IT.

FIELD OF THE INVENTION

This invention relates to a threaded fastener which can freely be spun onto a thread and set to a given torque, and then positively can be locked in place, and to a method and to a tool for setting it.

BACKGROUND OF THE INVENTION

Setting a threaded fastener such as a threaded pin and collar combination (nut and bolt) to a predetermined torque, and locking it so it does not loosen is an objective of joints which must retain their reliability. There are numerous approaches to this objective, ranging from the use of lock washers to the use of structurally inherent torque limiting and thread drag means in the collar.

A problem with conventional means of this type is that the locking means frequently requires the exertion of force during the torquing operation to overcome its resistance during the setting operation. This frustrates or makes more difficult the attainment of a known axial tensile preload in the torqued-up joint. Ideally, if the nut or collar were free spinning and frictionless, axial preload in the pin or collar (which preload is the clamping force on the joint) would be directly and almost linearly a function of the applied torque. But many locking systems require deflection of material for the locking action, which must be overcome during the torquing operation by some part of the torque force. The confusion of forces makes more difficult the certain attainment of a known axial preload.

An example of such prior devices is the Hi-Lok fastener shown in Wing U.S. Pat. No. 2,940,495, in which an out-of-round portion of the collar is rounded out by the threaded pin to exert a spring-back locking force on the pin. Although this fastener is very effective and enjoys widespread use, still the forces for axial preload and the forces required to overcome the resistance of the locking means are concurrently applied.

Another example is shown in Wing and Schuster U.S. Pat. No. 3,129,630. In this device, known commercially as the Beta Bolt, before installation, a bolt is threaded into an internally threaded collar, and then the collar is dimpled to distort its inside threads at that point. This distorts the thread on both the pin and outer collar. The distortion on the collar thread will provide a running lock against the pin thread. The collar is inserted into a workpiece and the bolt is turned in the collar to form a head. A disadvantage of this type of device is that when the fastener is set, the deformed parts of the two threads are moved away from each other. The only "locking" action is the drag exerted by the deformed collar. This is not a positive lock in the sense of the instant invention, and again the drag must be overcome while setting the fastener.

Another approach is shown in Stencel U.S. Pat. No. 4,260,005. This device is known as the Eddie Bolt. The collar has protrusions that are abutted by the setting tool to apply the torque, and when the desired torque is reached, then in theory the protrusions fail exactly at that time and no longer can transmit any torque. At that same time the tool is proposed to press against and round out the protrusion material, and through it to press the collar against a non-round thread on the pin. This deformation is theorized to lock the collar onto the pin. The problem is again the confusion of the torque and the locking forces. Because the protrusions must perform two functions, confusion can result. Also, the internal deformation of the collar might not occur at a suitably-shaped part of the thread on the pin to assure locking.

It is an object of this invention to overcome the shortcomings of the above devices. In so doing, a purely free-spinning collar can be spun onto a threaded pin, and to a given torque. The collar can then be locked to the pin by using an entirely separate force system. There is no confusion of forces, and each force can separately be determined and provided. Further objects are to provide a method to attain this, and to provide a tool for doing it.

BRIEF DESCRIPTION OF THE INVENTION

The invention involves the formation of a joint utilizing an externally threaded pin, and an internally threaded collar. The collar is set to a predetermined torque, without thread drag from any locking or drag means. Then after proper torquing, the collar is locally dimpled to displace material at its internally threaded surface to exert a locking force against the pin, which may and usually will include local complementary deformation of the thread on the pin so as to provide a physical interlock.

Preferably but optionally, discontinuities may be formed in the thread on the pin to receive and interengage with the deformed material on the inside of the collar.

The invention comprises the fastener, the assembled joint, the method of setting, and a tool for setting the fastener.

As to the tool, it includes a drive spindle carrying a plurality of balls, and a cam member behind the balls. In one position the cam member holds the balls against a driving surface on the collar to drive it. In another position, the cam member presses the balls into the collar to create the dimples and locks. It can also be used as part of a torque-limiting feature.

The above and other features of this invention will be fully understood from the following detailed description and the accompanying drawings, in which:

BRIEF DESCRIPTION OF THE DRAWINGS

FIG. 1 is an axial cutaway cross-section showing the presently preferred embodiment of the invention;

FIG. 2 is a cross-section taken at line 2—2 in FIG. 1;

FIG. 3 is a fragmentary and partly schematic continuation of the upper part of the device in FIG. 1;

FIG. 4 is a fragmentary view taken at line 4—4 in FIG. 3;

FIG. 5 is a cross-section showing the set fastener;

FIG. 6 is a side view of FIG. 5;

DETAILED DESCRIPTION OF THE INVENTION

Figure 7:
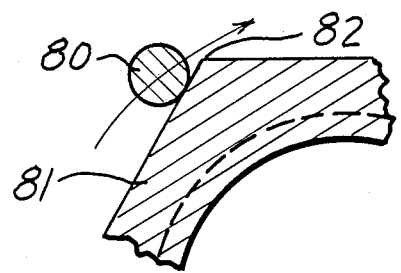
FIGS. 7 and 8 are fragmentary views showing the balls being used as part of a torque-limiting system.

The purpose of the invention is to provide a joint 10 which has carefully regulated and easily established levels of torque and axial preload in a locked fastener using a fastener which was free-spinning while being torqued down, and is finally locked firmly in place. The joint is shown schematically as including a pair of workpieces 11, 12 which are exemplary of any pair of bodies (or more) which are intended to be joined together by a fastener 13 which is passed through apertures 14, 15 in workpieces 11 and 12 respectively.

The fastener itself comprises a pin 20 having a cylindrical shank 21, a head 22 and a threaded end 23. Adjacent to the threaded end there is an external thread 24. In accordance with the preferred embodiment of the invention, this thread is modified by a plurality of notches 25 preferably immediately adjacent to one another and also preferably but not necessarily extending to nearly the pitch root of the thread. This provides what will hereinafter be referred to as an "interrupted thread".

As will later be understood, the notches are not a necessary feature and when they are used, then instead of being in immediate adjacency to one another they can be spaced apart from one another. In fact some features of the invention are useful even with threads which do not have the interrupted feature.

A collar 30 in the nature of a nut has an internal passage 31 with an internal thread 32 intended to match the dimensions of thread 24 so the collar can be tightened down onto the pin to clamp the workpieces together. The collar is shown as a conventional hexagonal type with driving faces 33, 34, 35, 36, 37, and 38.

The fastener shown has a right-hand thread, although left-handed threads can be accommodated with suitable modification of the tool.

The objective of the tool and the method of setting the device is to provide a threaded joint, clamped down by the exertion of a predetermined torque to produce a resulting axial preload, and held there is a consequence of an indentation 40 (FIG. 6) formed in the collar, in this case in one or more of the driving faces. In the illustrated embodiment these indentations (sometimes called dimples) will be formed in faces 33, 35 and 37. As can best be seen in FIG. 5, the consequence of this indentation is a deformation 41 of the wall material bounding the interior passage such that it is deformed into and around the notches on the thread. Similarly, those portions of the thread on each side of the notch will themselves be somewhat deformed so that there is a mutual spring-back relationship between these parts. As illustrated in FIG. 5, this indentation creates a positive lock that cannot be overcome by reverse torque except by cutting through the indented and deformed material. This invention provides a tool for accomplishing this purpose and a method for carrying it out.

At this point it may be useful to observe that even if the notches had not been formed on the pin threads, the deformation shown would still have displaced collar material into firm surface contact with the surface of the pin. Furthermore, it would (depending on the modulus of the two materials) have indented the pin somewhat, thereby providing at least some physical barrier to unthreading, as well as the more frictional-type surface-to-surface abutment known as a running lock.

Tool 50 is shown in FIGS. 1 and 3. Basically it includes a drive spindle 51 which is a cylindrical tube in which there are three apertures 52, 53, 54, to receive balls 55, 56 and 57, respectively. The apertures are conveniently in the nature of drilled holes so that the balls can move radially relative to the central axis 58 of the tool. The diameter of the balls is about equal to the diameter of these apertures, and it is convenient to provide some kind of retainer means to retain the balls from falling out of the apertures.

A cam member 60 is tubular and surrounds the drive spindle and is adapted to rotate with it, although it also has limited movement relative to it as will later be shown. The cam member is tubular with an inside cylindrical surface 61 which fits slidably against the outside cylindrical surface 62 of the drive spindle. Sunk in the surface 61 of the cam member there is a cam 63 with a first and a second cam segment 64, 65 respectively interconnected by a ramp segment 66.

As can best be seen in FIG. 2, the balls are used to apply setting torque to the faces of the collar. While the balls are shown bearing against the collars at the central point of each face, it will be more customary to provide the first segment at such a depth in surface 61 that contact will be made about half way between the midpoint of the face and the dihedral edge ahead of it, which will improve the torque relationship. In any event, with the cam member in the position illustrated in FIG. 2, the ball is trapped between its respective driving face on the collar and the respective first cam segment. Then when the drive spindle is rotated as shown by arrow 67, that torque will be applied to the nut to drive it. This driving will continue until a desired torque is reached which might be determined by an overriding clutch or any other torque-responsive means. Then it is discontinued.

Next, it is desired to provide the indentation shown in FIG. 5. The means for doing this is shown in FIG. 3 which shows a continuation of the drive spindle and the cam member. It shows their upper ends. The entire tool is supported from a handgrip 70 of a typical motor which rotates shaft 71 to drive the system.

At this point it will be noted that the tool shown is simply applied to a nut which is already initially threaded on to the bolt or which might instead have the nut initially thrust into the tool and then threaded onto the bolt. It is equally possible to provide a collar feeding means at the upper end of the device, placing the drive to one side in accordance with conventional tool designs. In any event, motor 72 drives the drive spindle and tightens down the collar on the pin. As stated before, when the desired torque has been reached, the motor might stall out or might be disconnected from the spindle. Next, the indentation is to be formed.

For this purpose, the cam member must be rotated to the position shown in FIG. 5 where the ramp segment 66 and second cam segment 65 move the ball to the radial position shown in FIG. 5 to create the indentation. This rotation of the cam member relative to the spindle may be accomplished by pressing cam actuator 75 in an axial direction so as to move pins 76 downwardly through spiral tracks 77 (See FIG. 4) to cause this rotation. The drill spindle will not be turning at this time, because the relative angular movement of the cam occurs after the driving is completed.

If desired, power means may be provided to shove the cam actuator 75 in an axial direction.

It will be noted that an upper plate 78 of the cam actuator is freely fitted around shaft 71 so that it can turn with the drive spindle.

Interruptions, such as notches, when used should be provided around at least a full convolution of thread in order to assure that the indented material will contact it. Depending on the number of indentations, a lesser extent is tolerable, but usually will not be preferred.

Figure 8:
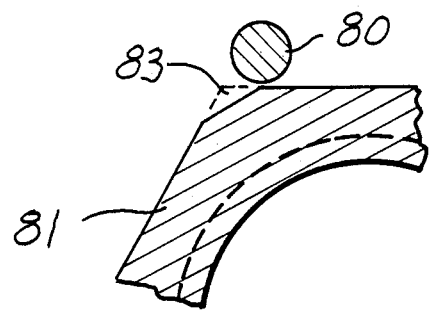

This invention offers a number of optional features. For example, the first cam segments 64 can be formed at such a radial depth in surface 61 that the balls will bear against the respective driving surface relatively near to its edge. Then application of sufficient torque can cause the ball to break through the dihedral edge, i.e., to fail the nut material at this location. This can be used as a torque-limiting means. FIGS. 7 and 8 show this against driving face 81 near dihedral edge 82. FIG. 8 shows what occurs when sufficient torque is applied that the ball displaces metal in the dihedral angle. It forms a channel 83. Also, instead of rotating sleeve 60 by means of the key and groove arrangement, the segments 64, 65 and 66 could be axially aligned, and tube 60 itself could be moved axially to cause the balls to make the indentation. Relative movement to shift the ball axially is what is required.

Figure 9:
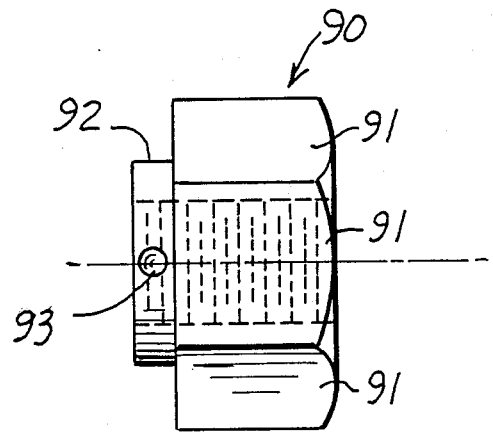
FIG. 9 shows an alternate location for the locking deformation.

FIG. 9 illustrates the fact that the indentation for locking purposes can be exerted at locations other than the driving faces. In this embodiment, a free-spinning collar 90 is provided with an array of driving surfaces 91, adjacent to a cylindrical locking section 92. After the collar is set to its predetermined torque, a ball (not shown) can make dimple (indentation) 93 in section 92 to lock the collar to the pin. The ball which drove the collar could be shifted to the axial location of section 92 for this function. Optionally, the driving surfaces could be driven by a common wrench with the ball aligned with section 92 or two wide pendent sets of balls could be provided, one to drive the driving surfaces, and the other to form the dimple.

There has been shown a method for driving a free spinning threaded collar onto a thread which may or may not be an interrupted thread. After the desired torque level has been reached, the collar is indented to displace material on its inside wall so as to make either or both of a tight frictional engagement with the thread or a physical interlock with the elements of the interrupted thread.

This invention thereby provides a means for separating the forces required to generate a desired axial preload and to lock the device. The locking action has no appreciable effect on the torque level or axial preload level which has already been attained.

This invention is not to be limited by the embodiments shown in the drawings and described in the description which are given by way of example and not of limitation, but only in accordance with the scope of the appended claims.

I claim:

1. A tool for setting a fastener, which fastener comprises an externally threaded pin and an internally threaded collar, said collar having external driving faces, said pin and collar having a mutual central axis and respective threads which engage and enable said collar to be freely spun onto said pin, said tool having a central axis that is coincident with the central axes of the collar and pin when the three are engaged, said tool comprising:

a tubular drive spindle having an axis and a radial aperture;

a drive ball in said aperture adapted to move radially therein;

a cam member comprising a tube surrounding said drive spindle with an inner cylindrical surface embracing said drive spindle, and a cam in said inner cylindrical surface having a first and a second segment at different radial distances from said central axis, and a transition segment connecting them, said drive spindle and cam member being rotatable together, and said cam member being rotatably movable relative to said drive spindle and drive ball, said first segment being radially spaced from said central axis so that when it abuts the ball, it presses it against a drive surface so as to turn the collar when the drive spindle is turned, said second segment being spaced closer to said central axis so that when it presses against the ball as the consequence of rotary movement of the cam member relative to the drive spindle, the ball is indented into said face so as to distort material of the thread in said collar against the thread on said pin, whereby to form at least a running lock between said collar and said pin.

2. A tool according to claim 1 in which there is a plurality of sets of said apertures, balls, and cam segments, angularly spaced apart from one another.

3. A tool according to claim 2 in which said cam member is rotated by the axial movement of an axially movable cam actuator coupled to said cam member to convert axial movement of the cam actuator to rotary movement of the cam member.

4. A tool according to claim 1 in which said tool while torquing said collar brings the ball to bear against said drive surface near an edge thereof so the material at said edge fails at the exertion of a predetermined torque at said edge.

5. A tool according to claim 1 in which said ball when applying torque to said driving face displaces collar material adjacent to an edge of said face when a predetermined torque level has been exerted, so as no longer to exert a torque thereon.

* * * * *